(12) United States Patent
Jensen

(10) Patent No.: US 10,775,150 B2
(45) Date of Patent: Sep. 15, 2020

(54) OPTICAL ROUGHNESS SENSOR FOR A COORDINATE MEASURING MACHINE

(71) Applicant: HEXAGON TECHNOLOGY CENTER GMBH, Heerbrugg (CH)

(72) Inventor: Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 199 days.

(21) Appl. No.: 16/045,603

(22) Filed: Jul. 25, 2018

(65) Prior Publication Data

US 2019/0033056 A1    Jan. 31, 2019

(30) Foreign Application Priority Data

Jul. 26, 2017   (EP) ..................... 17183279

(51) Int. Cl.
| | | |
|---|---|---|
| *G01B 11/03* | (2006.01) | |
| *G01B 11/00* | (2006.01) | |
| *G01B 11/24* | (2006.01) | |
| *G01B 9/02* | (2006.01) | |
| *G01B 5/008* | (2006.01) | |

(Continued)

(52) U.S. Cl.
CPC ............ *G01B 11/005* (2013.01); *G01B 5/008* (2013.01); *G01B 9/02004* (2013.01); *G01B 11/007* (2013.01); *G01B 11/2441* (2013.01); *G01B 11/303* (2013.01); *G01B 9/02007* (2013.01); *G01B 9/02055* (2013.01); *G01B 9/02091* (2013.01); *G01B 21/04* (2013.01)

(58) Field of Classification Search
CPC .................................................. G01C 11/005

USPC ........................................................... 33/503
See application file for complete search history.

(56) References Cited

U.S. PATENT DOCUMENTS 5,388,342 A    2/1995   Garau et al.
5,402,582 A    4/1995   Raab
(Continued)

FOREIGN PATENT DOCUMENTS

CN    1069569 A    3/1993
CN    1831474 A    9/2006
(Continued)

OTHER PUBLICATIONS

European Search Report dated Sep. 14, 2017 as received in Application No. 17183279.

*Primary Examiner* — George B Bennett
(74) *Attorney, Agent, or Firm* — Maschoff Brennan

(57) ABSTRACT

An optical roughness sensor for a coordinate measuring machine, comprising a beam coupling unit for coupling and decoupling optical radiation, a local reference oscillator element for providing a reference path and an interferometric reference signal by means of a reference radiation component of the radiation, a first decoupling path comprising a first beam passage window for bidirectional transmission of a measuring radiation component of the radiation such that the measuring radiation component is aligned onto an object surface to be measured and a reflection of the measuring radiation component is acquired and a surface signal is provided by the reflected measuring radiation component. The reference path and the decoupling path interact such that the reference signal and the surface signal interfere and a roughness signal is derivable.

15 Claims, 3 Drawing Sheets

(51) Int. Cl.
    *G01B 11/30*         (2006.01)
    *G01B 21/04*         (2006.01)

(56) References Cited

U.S. PATENT DOCUMENTS

| | | | |
|---|---|---|---|
| 2016/0091299 A1 | 3/2016 | Smythe et al. | |
| 2017/0365065 A1* | 12/2017 | Stigwall | G06T 7/11 |
| 2018/0066933 A1* | 3/2018 | Seitz | F21V 14/06 |
| 2018/0328706 A1* | 11/2018 | Yamamoto | G01B 5/008 |
| 2019/0072382 A1* | 3/2019 | Hirano | G01B 11/303 |
| 2019/0094010 A1* | 3/2019 | Demiter | G01B 11/24 |
| 2019/0154429 A1* | 5/2019 | Heymer | G01B 11/005 |
| 2019/0219387 A1* | 7/2019 | Sakai | G06T 7/571 |
| 2019/0242702 A1* | 8/2019 | Singh | G01B 5/28 |
| 2019/0383605 A1* | 12/2019 | Jensen | G01B 11/25 |

FOREIGN PATENT DOCUMENTS

| | | |
|---|---|---|
| CN | 205482840 U | 8/2016 |
| DE | 43 25 337 A1 | 2/1994 |
| DE | 43 25 347 A1 | 2/1994 |
| DE | 197 35 975 A1 | 3/1999 |
| EP | 1 474 650 A2 | 6/2007 |
| EP | 2 463 615 A2 | 6/2012 |
| EP | 2 690 395 A1 | 1/2014 |
| WO | 1992021934 A1 | 12/1992 |

\* cited by examiner

OPTICAL ROUGHNESS SENSOR FOR A COORDINATE MEASURING MACHINE

CROSS-REFERENCE TO RELATED APPLICATIONS

This application claims priority to European Patent Application No. 17183279.3 filed on Jul. 26, 2017, which is incorporated herein by reference.

FIELD OF THE INVENTION

The invention relates to an optical roughness sensor for acquiring an item of surface information and a coordinate measuring machine (CMM) for the roughness measurement of an object surface by means of such a sensor.

BACKGROUND

In many technical fields of application, the need exists to measure surfaces of objects and thus also the objects themselves with high accuracy. This applies in particular to the manufacturing industry, for which the measuring and checking of surfaces of workpieces has great significance, in particular also for the purposes of quality control.

Coordinate measuring machines are typically used for these applications, which enable a precise measurement of the geometry of an object surface, typically with micrometer accuracy. Objects to be measured can be, for example, engine blocks, transmissions, and tools. Known coordinate measuring machines measure the surface by establishing a mechanical contact and scanning the surface. Examples thereof are gantry measuring machines as described, for example, in DE 43 25 337 or DE 43 25 347. Another system is based on the use of an articulated arm, the measuring sensor of which, which is arranged at the end of the multipart arm, can be moved along the surface. Articulated arms of the type in question are described, for example, in U.S. Pat. No. 5,402,582 or EP 1 474 650.

In the prior art, an optical or tactile sensor is used as a standard measuring sensor with such coordinate measuring devices, said tactile sensor consisting, for example, of a ruby sphere which is mounted on a measuring rod. The deflection of the tactile sensor, in the case of a coordinate measuring machine designed for three-dimensional measurements in three directions X, Y, and Z perpendicular to one another, is determined during the scanning via a switch element or distance-measuring element. The location of the contact and therefore the surface coordinates are calculated on the basis of the switching point or deflection distance.

To reconstruct the surface profile from the measurement data, the mechanical dimensions of the sensor itself and its alignment during the contact with the object surface must be considered. The sensor is designed having a measuring tip of known geometry, typically spherical or, for special applications, ellipsoidal, typically having a (main) radius in the order of magnitude of several millimeters. The term "measuring tip" is to be understood in conjunction with the present invention in general as a (tactile) measuring sensor of any arbitrary shape and dimensions, wherein it does not necessarily have to (but can) have a shape tapering to a point. The raw data measured using the coordinate measuring machine while using a tactile sensor represent the measured location coordinates of a reference point of the measuring tip, for example, the measuring tip center.

However, the measurement resolution is restricted because of the physical dimensions of the measuring tip of the tactile sensor. The physical dimensions of the measuring tip and/or the limited measurement resolution linked thereto result in a "smoothing effect" during the measurement of rough surfaces: While protrusions or peaks of an object surface can be measured nearly perfectly or faithfully to the object, the measuring tip of the tactile sensor cannot penetrate into narrow depressions of an object surface because of its physical dimensions. This causes a smoothing of the measured surface profile in a nonlinear manner, by the measurement data of depressed surface regions being smoothed while the measurement data of raised surface regions are nearly faithful to the object. For engineering aspects, this is even often advantageous, because, in particular for a planar connection of surfaces of two objects, an accurate knowledge of the raised regions thereof is more important than the accurate determination of narrow depressed surface regions.

On the other hand, the resolution of tactile measurements, in particular for a more accurate measurement of surface depressions, is no longer sufficient for many new applications because of the above mentioned limitations inherent to the method.

Therefore, approaches have been followed in the meantime in the prior art for contactless measurement, in particular using optical sensors. Surface depressions can also be measured very accurately by means of an optical sensor using an emitted measuring light beam, in particular from a laser, as long as the focus of the measuring light beam, in comparison to the measuring tip of a tactile sensor, on the object surface is not larger than the structure of its depressions. The resolution of optical measuring methods can accordingly be significantly higher than that of tactile measuring methods for accurate measurement of surface profiles, in particular the depressions thereof. Accordingly, a profile prepared using an optical sensor differs from a profile prepared using a tactile sensor of the same object surface. A surface profile prepared using an optical sensor, like a surface profile prepared using a tactile sensor, also represents a depiction of the actual object surface filtered in its resolution and based on the physical dimensions of the "measuring tip", wherein the dimensions of the optical "measuring tip" can be considered to be converging toward the wavelength of the optical measuring radiation in comparison to the measuring tip of a tactile sensor or are negligible. Therefore, optical sensors and measuring methods for a coordinate measuring machine are suitable in principle for providing an actually object-faithful measurement of a surface profile.

Optical sensors or measuring methods for a coordinate measuring machine are linked to an array of advantages: The measurement takes place in a contactless manner, and the optical sensor can be guided more rapidly than a tactile sensor over an object surface, with smaller physical dimensions of the "measuring tip", whereby a higher lateral resolution of the measurement is enabled.

Nonetheless, surface profiles prepared not only with tactile sensors, but rather also with optical sensors still always contain features which do not originate from the measured surface but rather are caused by the measuring method. For example, measurement errors in the height determination of a surface because of vibrations of the coordinate measuring machine used and method measures for suppressing these effects are known from DE 197 35 975.

The measurement results of optical sensors, in particular for interferometric measuring methods, are often disadvantageously influenced by phase noise or speckle effects. Depending on the roughness of the object surface, for example, the phase of the light reflected from a surface can be changed in such a manner that a distance measured to a targeted object point is incorrect. As a consequence of such local optical interfering influences, surface profiles measured using optical sensors often have measurement errors, for example, virtual singular peaks or depressions which do not exist in the object surface, however.

Presently stationary, tactile measuring devices are predominantly used for roughness measurement. The test subject is placed in this case on a measurement table and a needle is guided linearly over the object while in contact with the surface. In this case, height changes of the needle can be registered and a height profile can be derived therefrom. As mentioned above, the measurement resolution is also dependent here on the needle geometry.

One disadvantage of such a device is the requirement that the workpiece has to be placed on the measurement table for this purpose. Depending on the workpiece size and shape, this can be very complex and time-consuming. More recent approaches therefore propose the combination of a specific roughness sensor with a coordinate measuring machine, to be able to avoid a transportation of the test subject.

The "BMT MiniProfiler" from Breitmeier Messtechnik GmbH is known as such a sensor, for example. The sensor can be provided as an interchangeable system in a magazine for repeated coupling and decoupling to and from a CMM. The control and evaluation can take place directly in the CMM operator interface. The sensor is brought into contact with the object surface. The CMM remains stationary during the following roughness measurement, i.e., the sensor as a whole is not moved in relation to the object. The needle of the sensor is guided in this state over the surface. Vibrations caused by the CMM can be reduced in this way.

Nonetheless, remaining external vibration on the part of the CMM or position errors caused by other environmental influences cannot be precluded and can negatively influence the measurement result. Furthermore, nonlinear effects can occur during the movement of the needle (movement of masses), which cannot be taken into consideration by the sensor.

A further disadvantage of this roughness acquisition and the workpiece to be checked is the mechanical contact existing in this case between sensor and workpiece. Undesired changes of the surface can occur in this way, in particular in the case of sensitive workpiece surfaces, for example, special coatings.

SUMMARY

One object of some embodiments of the invention is therefore to provide an improved roughness sensor, wherein the above mentioned problems can be solved by the sensor.

In particular, it is an object of some embodiments of the present invention to provide an improved roughness sensor, in particular with respect to reliability and accuracy of acquired measurement data, for use with a coordinate measuring machine.

These objects are achieved by the implementation of the characterizing features of the independent claims. Features which refine the invention in an alternative or advantageous manner can be inferred from the dependent patent claims.

Some embodiments of the invention are based on the concept of, instead of a standard contacting sensor, providing such a sensor with reduced influence on the surface to be measured.

In contrast to the prior art, some embodiments of the invention are based on an optical measuring principle for acquiring roughnesses of a surface. The preferred principle is based on the interference of different signals which can be provided on the part of the sensor. Moreover, the use of the approach of optical coherence tomography for the analysis of the signals and the derivation of a surface profile is proposed.

Some embodiments of the invention relate to an optical, in particular interferometrically measuring roughness sensor for a coordinate measuring machine, comprising a beam coupling unit for coupling in optical useful radiation and in particular decoupling different interference signals and comprising a local reference oscillator element for providing a reference path and an interferometric reference signal by means of a reference radiation component of the useful radiation. The reference oscillator element can in this way provide a local oscillator (LO).

The roughness sensor moreover has a first decoupling path comprising a first beam passage window for the bidirectional transmission of a measuring radiation component of the useful radiation. The beam passage window can be formed, for example, by an optical unit or a recess on the sensor housing. The beam passage window is rather to be understood as generic, however, and independently of its design, it provides an emission of radiation from the sensor and the reception of reflected radiation.

By means of the first decoupling path, the measuring radiation component can be aligned on an object surface to be measured and a reflection at the object surface of the measuring radiation component can be acquired, wherein a surface signal with respect to the object surface can be provided by the reflected measuring radiation component. The surface signal in this case contains in particular an item of information with respect to a present distance from the object surface.

The reference path and the decoupling path are moreover arranged such that the reference signal and the surface signal interfere and a roughness signal is derivable based on the interference of reference signal and surface signal. The arrangement is selected such that the interference remains in existence during a movement of the decoupling path, i.e., is provided (continuously) over a scanning route defined by the mobility of the decoupling path.

Using this device, an axial distance (in the direction of the optical emission beam axis or z axis) can be measured between the roughness sensor and a point of the measured surface.

If the measuring beam is now additionally moved along a scanning path or a scanning axis, for example, parallel to or with a uniform distance to a surface to be measured, and if distance data are acquired in this case at a determined frequency or continuously, a surface profile (axial distance values via a lateral position change along the scanning axis) can thus be prepared for the scanned route. The measuring beam is moved transversely (laterally) for this purpose in relation to its propagation or emission direction, i.e., laterally with respect to a measuring beam direction.

For such a scanning roughness measurement of an object surface, the knowledge or the determination of a distance or a distance change between the sensor and the surface during the measurement is advantageously provided. Without an item of information in this regard, the optical roughness measurement can sometimes be strongly subjected to errors, for example, as a result of unexpected external influences (for example, impacts) or undesired deviation from the provided scanning path.

The movement of the decoupling path over the object can take place in various ways. On the one hand, the roughness sensor, coupled to a coordinate measuring machine (CMM), can be guided along a defined path automatically and in a motorized manner. If the surface profile of the object to be measured is known, the scanning path can be defined in a manner adapted accordingly for the roughness sensor. A measurement accuracy for the roughness values resulting therefrom is in the scope of the measuring or guiding accuracy of the CMM in this case.

Alternatively or also additionally, the roughness sensor can have a distance reference element arranged in a fixed position relationship relative to the beam coupling unit (or sensor housing). The distance reference element is designed in this case for the surface-contacting guiding of the roughness sensor and for providing a constant distance to the object surface during a roughness measurement. The distance reference element can be formed like a runner, for example, for this purpose, and therefore a (quasi-)sliding contacting and guiding over the surface is enabled. For example, one embodiment has a low-friction surface coating as a runner. Furthermore, a three-point support having three curved (for example, spherical) support elements is conceivable.

In other words, the distance reference element (for example, runner or hemisphere) can be placed onto the surface to be measured for a measurement, the sensor can be moved over the surface by a controlled movement of the CMM measuring head (to which the roughness sensor is coupled) while maintaining the contact between distance reference element and surfaces, and the acquisition of distance data can be executed continuously using the roughness sensor.

In both above-described variants, the lateral surface offset can be determined on the basis of the position data (coordinates) provided by the coordinate measuring machine and can be used for the preparation of a roughness profile.

The determination of distances using the sensor can take place by means of optical metrology based on tuned optical coherence tomography (OCT). This enables a distance determination over a comparatively large range, only limited by the coherence length of the laser radiation used. Due to the distribution of corresponding optical signals (see below) onto different reflection points (inside and outside the sensor), it is possible to acquire or monitor different distances jointly (simultaneously).

Due to the guiding of the roughness sensor by means of the CMM to measure a surface profile, for example, vibrations can increasingly occur in the system, which can result in an increased risk of error for the roughness data.

To avoid a CMM movement during the measurement and thus for an expected increase of the measurement accuracy and measurement reliability, the roughness sensor can, in one embodiment, have an (internal) drive unit for moving the first decoupling path. The drive unit is coupled in this case to the first decoupling path such that the first decoupling path—and thus the emitted measuring radiation—is movable in a controlled manner relative to the beam coupling unit parallel or coaxially along a scanning axis (in the x direction) over a defined scanning route. The movement takes place transversely, in particular orthogonally, to the emission direction of the measuring radiation component through the beam passage window. The movement therefore takes place in the meaning of the present invention laterally with respect to this emission direction and typically also laterally over a surface to be measured.

"Laterally" is understood in the context of this invention with respect to the emission direction of the measuring radiation of the sensor, i.e., laterally (transversely) to this emission axis and, for example, in particular also in the direction of the scanning axis.

The lateral positions of the decoupling path or the emitted measuring radiation can be tracked and determined, for example, by means of a stepping motor. The drive can alternatively or additionally be provided with a linear encoder for position acquisition in the x direction.

During such a roughness measurement, the roughness sensor can be held unchanged in a determined position and orientation in relation to the object. The lateral measuring route in the x direction is then in particular provided solely by an adjustment of the decoupling path by means of the drive. However, a superposition of a movement of the measuring head of the CMM, i.e., of the roughness sensor coupled thereto in this case, and the internal drive unit is also conceivable.

In one embodiment, the optical roughness sensor has a lateral position path for providing a lateral position signal with respect to a scanning axis position of the decoupling path, wherein the lateral position path is defined by a reflection of a lateral beam component of the useful radiation. A part of the useful radiation can thus be used for the purpose of determining the lateral x position for the roughness profile. An associated position value in the x direction can be determined for each height value in the z direction. The data can be associated with one another and corresponding surface coordinates and thus a profile can be derived from the value pairs.

The lateral position signal can also be brought into interference with the reference signal, wherein the lateral position change (i.e., the x coordinate of the roughness profile) can be established on the basis of this interference.

According to one specific embodiment, the roughness sensor can have a first beam splitter, wherein the first beam splitter provides an at least partial separation of the decoupling path (measuring radiation component) and the lateral position path (radiation component for determining the x position), in particular a separation of the lateral radiation component and the measuring radiation component.

The beam splitter can have in particular a specific transmittance level (for example, 5%), to be able to separate the reflected measuring signal as unambiguously as possible from the reflected lateral position signal. Thus, for example, 95% can be reflected and can be available to the decoupling path and 5% can be transmitted and reflected as the lateral signal. This is advantageous for the analysis and identification of the different signals.

The optical roughness sensor can moreover have a reflective surface, in particular a mirror, for providing the reflection of the lateral radiation component. The reflective surface can be in particular arranged or vapor deposited directly on the first beam splitter. Alternatively, the mirror can be arranged in a separately formed beam path, for example, in a free beam optical unit or by means of an optical fiber.

In one embodiment, the reference oscillator element is provided by an end face of a ferrule (sleeve), in particular of the beam coupling unit. A first partial reflection of the introduced useful radiation (for example, approximately 4% of the useful radiation is reflected) can occur here at the edge of the ferrule. This partial reflection generates a local oscillator signal (reference signal) and thus represents a type of reference position.

The reference oscillator element can alternatively be represented by the reflective surface arranged on the first beam splitter, wherein then the signal for the local oscillator is provided by a reflection of a part of the useful radiation.

For example, a beam splitter can have a 5% transmittance and the transmitted radiation can be guided onto the reflective surface.

Using the present invention, it is additionally possible to monitor and compensate for different influences which can influence an accuracy of a roughness measurement.

A main influence can come from the coordinate measuring machine, even at a standstill of the CMM. Because of the air bearings and the naturally limited stiffness of the CMM, vibration frequencies of several hertz and small amplitudes can occur almost continuously. These typically have a negligible influence on the measurement point determination, however, the effects on a roughness measurement are significant. Another influence is based on the limited stability of the internal drive of the sensor, whereby, for example, (lateral and/or axial) oscillations can occur during the movement. The internal drive of the sensor can also be negatively influenced by nonlinearities.

For a compensation of possibly occurring interfering influences on a measurement, the roughness sensor according to the invention can have a signal compensation arrangement for providing at least one compensation signal.

Firstly, an item of information with respect to a measuring position of the roughness sensor relative to the object surface, in particular with respect to a distance between roughness sensor and object surface, can be provided by a first compensation signal. In this way, an offset of the roughness sensor can be detected and taken into consideration during a roughness measurement. A vibration or oscillation of the sensor during a measurement is also to be understood as an offset in this case.

Secondly, an item of compensation information with respect to a relative positioning of the decoupling path in a roughness sensor housing can be provided by means of the signal compensation arrangement by a second compensation signal. In this case, a possible internal offset for the measuring beam decoupling, for example, an undesired axial or lateral offset of the decoupling path, can be detected and taken into consideration. Internal oscillations, which can be caused, for example, by the drive unit, can also be acquired in this case.

In an OCT tomogram (Fourier-transformed interferogram), the individual detected signals and thus measurable distances can be separated by bandpass filtering and then further processed as individual distance values. In this way, all relevant distances can be measured simultaneously and synchronized with respect to possible measurement interference (for example, vibration of the CMM or internal drive errors).

The (already compensated) roughness data can then be extracted by an adapted combination of the measured signals.

In general, the bandpass filtering enables a separation of individual distances in the roughness sensor and thus the individual dissemination and association of the respective signals. For this purpose, the routes of the individual beam paths (decoupling path, reference path, lateral compensation path, and scanning compensation path) can be configured differently by appropriate arrangement of the respective reflection surfaces. Crosstalk of signals can thus be prevented and clarity can be provided for the analysis.

In one embodiment, the signal compensation arrangement has a second decoupling path having a second beam passage window, wherein a bidirectional transmission of a first compensation component of the useful radiation is provided, in particular parallel to the measuring radiation component. The first compensation component can be aligned onto the object to be measured and a reflection on the object of the first compensation component can thus be acquired accordingly. The first compensation signal can be provided by the reflected first compensation component.

In particular, the second decoupling path is arranged fixed in position relative to the beam coupling unit, in particular fixed in position relative to the roughness sensor housing.

While the first decoupling path is thus moved for a measurement in a lateral x direction, to enable a line-by-line acquisition of the object surface, the second decoupling path remains in an unchanged position relative to the object surface in this case (for the measurement, the entire sensor is moved into a fixed position relative to the measured object and held there). In this way, data can be derived continuously via the second path for substantially one point of the surface, wherein in particular the distance to this point can be monitored. Occurring vibrations of the roughness sensor can be acquired by the distance monitoring and can be offset with the profile data measured via the first decoupling path. The axial vibrations which can be established generally also occur accordingly for the measuring path of the measuring radiation, because of which such a compensation can be very accurate and have high reliability for the roughness data.

The roughness sensor can accordingly have a second beam splitter, for example, having a 50% reflection level, which provides the decoupling of the first compensation component from the useful radiation.

In one embodiment, the signal compensation arrangement has a reference component extending in parallel or coaxially to the scanning axis. The reference component can be designed, for example, as a reflecting element (mirror). For this purpose, a decoupling of a scanning compensation component from the useful radiation along a scanning compensation path can be provided, wherein the scanning compensation path is connected to the first decoupling path and is arranged so that it is movable by means of the drive unit jointly with the first decoupling path along the scanning axis. Moreover, a reflection of the scanning compensation component on the reference component can be provided for at least a part of a scanning route (defined, for example, by a route along which the first decoupling path can travel) and can be provided as a second compensation signal by the reflected scanning compensation component.

This embodiment of the signal compensation arrangement provides a joint movement of the compensation path with the measuring path. The two paths are combined such that a fixed position and orientation reference is produced. The reference component is, for example, fixedly connected to the sensor housing. In this way, the monitoring of a possibly undesired position deviation of the decoupling path and thus of the measuring path and measuring signal by means of the compensation arrangement is enabled.

For the decoupling of the scanning compensation component from the useful radiation, the roughness sensor can have a third beam splitter which provides this decoupling.

According to one embodiment of the invention, the signal compensation arrangement can be arranged such that the first and/or the second compensation signal interfere with the reference signal and a compensated roughness signal is derivable based on an interference of
reference signal with surface signal and
reference signal with first compensation signal and/or
reference signal with second compensation signal.

The "raw" surface or roughness profile (with additional consideration of associated x positions) can be derived from the interference of reference signal and surface signal. Axial distances (z component of the surface profile) are acquired via a traveled scanning route (x component of the surface profile).

Alternately or entirely, in addition, an interference of reference signal with first compensation signal and/or an interference of reference signal with second compensation signal can also be taken into consideration accordingly.

The interference of reference signal with the first compensation signal supplies direct compensation data with respect to external influences on the sensor, which make a position influence of the sensor during the measurement accessible and correctable. Distances between the sensor and the surface can be measured continuously and the measured values can be offset with the data for the raw surface profile. Vibrations of the sensor are thus compensated for continuously and reliably.

The interference of reference signal with the second compensation signal supplies a direct item of information with respect to internal measurement states of the sensor and thus internal compensation data. In this way, for example, linear, parallel guiding of the decoupling path with respect to the scanning axis can be monitored or an internal oscillation or vibration can be acquired. Possible deviations can be derived from this interference signal and offset with the data for the raw surface profile. A compensation for internal interfering influences is thus provided.

In particular, the reference oscillator element is arranged in a fixed position relation relative to the first decoupling path and is movable jointly with the first decoupling path.

In one embodiment, the roughness sensor has an optical and/or mechanical interface, in particular an integrated optical-mechanical interface, wherein the interface provides a bidirectional transmission of optical radiation between the roughness sensor and a coordinate measuring machine and/or an energy transmission to the roughness sensor.

For example, the roughness sensor can have an internal energy store for the drive of the drive unit, which can be charged by the interface, in particular, for example, when the roughness sensor is kept ready in a changing magazine for a measurement. Alternatively or additionally, the interface provides a power supply of the sensor for and during a measurement.

The optical interface part can have a specific and robust coupler for coupling and decoupling the sensor many times.

Some embodiments of the invention also relate to a coordinate measuring machine for acquiring an item of surface information with respect to an object to be measured. The coordinate measuring machine has a base, an interface for arranging a measuring sensor for the acquisition of the item of surface information, and a guide for providing a relative movement of the interface relative to the base in at least one direction, in particular in two or three directions. Moreover, a control and processing unit is provided.

The coordinate measuring machine has, according to some aspects of the invention, a roughness measuring functionality, during the execution of which, controlled by the control and processing unit, the item of surface information can be acquired by optical scanning by means of an optical roughness sensor (=measuring sensor) arranged at the interface. In the scope of the roughness measuring functionality, the roughness sensor is moved into a defined position relative to the object surface and a scanning procedure is executed by a relative movement of a first decoupling path of the roughness sensor, wherein a measuring radiation component of a useful radiation is emitted onto an object surface to be measured and a reflection of the measuring radiation component at the object surface is acquired and a dataset representing a surface profile is generated as the item of surface information by means of a surface signal provided by the reflected measuring radiation component with respect to the object surface. The measuring head is held in a defined position relative to the object surface during the execution of the scanning procedure.

In particular, the roughness sensor is designed according to an above embodiment.

A comparatively high-resolution item of surface information for at least a part of the object to be measured can be obtained by the execution of a roughness measurement using the CMM. In particular, the line-by-line acquisition of the roughness profile can take place multiple times with a specific offset, for example, at small intervals in a direction orthogonal to the scanning axis. Thus, not only a two-dimensional roughness determination but rather a (quasi-) three-dimensional roughness determination can be carried out.

The CMM is thus capable, on the one hand, of providing a typical measurement of an object and moreover a roughness determination for a part of the object. Both datasets can be compiled into a common dataset and/or saved as a measurement model.

Furthermore, a roughness measurement using the sensor according to the invention can be associated with a specific position on a test subject by means of the CMM. The roughness profiles, which are generally generated with solely relative position reference, can thus be referenced in a superordinate object coordinate system.

BRIEF DESCRIPTION OF THE DRAWINGS

The device according to some embodiments of the invention will be described in greater detail solely by way of example hereafter on the basis of specific exemplary embodiments which are schematically illustrated in the drawings, wherein further advantages of the invention will also be discussed. In the individual figures.

DETAILED DESCRIPTION

Figure 1:
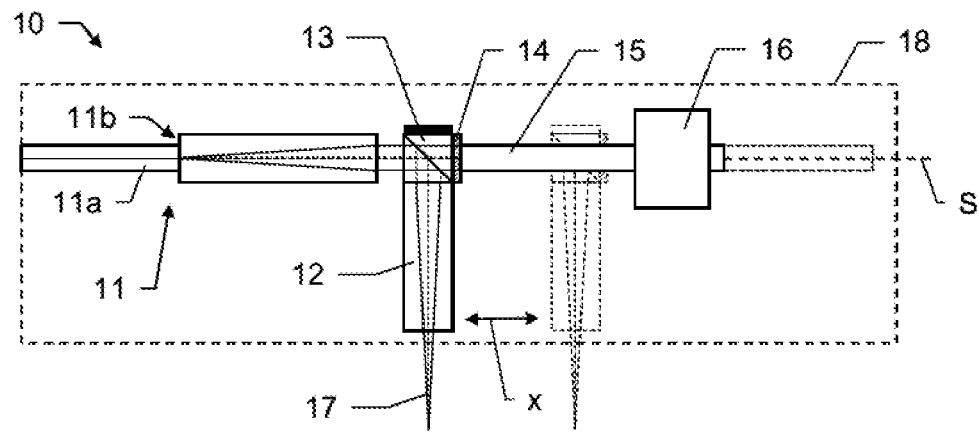
FIG. 1 shows an embodiment of an optical roughness sensor according to the invention.

FIG. 1 shows an embodiment of an optical roughness sensor 10 according to the invention.

The roughness sensor 10 has a beam coupling device 11, which is designed here as a fiber coupling 11a (for example, ferrule) comprising an optical unit (for example, lens arrangement) and provides the coupling and the decoupling of optical radiation. The useful radiation is guided by means of an optical fiber in the sensor 10.

The measurement principle of the roughness sensor 10 is based on the interference of signals with a reference signal R, which is provided by a local oscillator.

In one embodiment, the local oscillator can be provided by a reflection of the entry radiation at the end face of the beam coupling device 11 or ferrule 11a of the optical fiber (end face 11b). In this case, the end face (exit face) of the beam coupling arrangement 11 is to be understood as the reference oscillator element.

It is moreover conceivable that the local oscillator is formed by a reflective surface 14 (reference oscillator element) on the beam splitter 13. The reference oscillator element 14 is then arranged on the beam splitter 13. Alternatively, an exit surface of the beam splitter 13 can form the reference oscillator element 14 by vapor deposition of a reflective layer. In particular since the distance along the optical axis from the surface 14 up to a focused, axial measurement point of the measuring radiation 17 (for example, focal point/focus of the measuring radiation) is constant, this design can simplify the data analysis. Distance changes detected in this regard contain a direct item of roughness information for the measured surface.

The measurement principle of the roughness sensor 10 is based in particular on the known technology of optical coherence tomography, wherein light of a specific coherence length is used for distance measurement by means of interferometry. The measuring radiation used is preferably tuned in this case over a specific frequency range. The measurement range is substantially limited by the coherence length of the measuring radiation used and thus, for example, by the employed laser radiation source.

The beam splitter 13 provides a separation of a reference beam path for the local oscillator and a decoupling path of a measuring beam decoupler 12. The measuring beam decoupler 12 provides an emission and focusing of the measuring radiation 17 in the direction of an object to be measured and enables the acquisition of measuring radiation reflected accordingly at the object. The measuring beam decoupler 12 thus provides a surface signal due to the reflected measuring radiation.

Coherent laser radiation is preferably used as the useful radiation, wherein its reference signal component is brought into interference with the reflected measuring radiation by the optical structure. A roughness signal can thus be generated and provided based on the interference of the reference signal with the surface signal.

In other words, a punctiform item of distance information to an object to be measured can be obtained from the superposition of the reference signal with the surface signal. This item of information can represent an absolute or relative distance between the roughness sensor 10 and a point of the object surface.

The roughness sensor 10 moreover has a drive unit 16, which is connected by means of a piston 15 or a shaft to the measuring beam decoupler 12. The measuring beam decoupler 12 and therefore also the decoupling path can thus be moved in a lateral direction x along a scanning axis S by means of the drive unit 16. In this way, an at least line-by-line scanning movement of the measuring radiation 17 over the object surface is enabled.

To acquire a roughness profile of an object surface, the decoupling path for a specific scanning route is guided laterally over the object surface, wherein the roughness sensor 10 in its entirety, i.e., in particular the housing 18 of the roughness sensor, remains in an unchanged positioning relative to the object surface. During the movement of the measuring beam decoupler 12, reflections of the measuring radiation 17 from the surface and thus the surface signal are acquired continuously.

To detect and acquire the surface profile, the surface signal is detected or processed together with the reference signal—also during the relative movement of the decoupling path—at specific intervals or continuously. A lateral resolution of the surface profile can thus be influenced by the rate of the signal processing. The detection of the signals can take place, for example, by means of one or more correspondingly provided photodetectors. The processing of the detected signals can take place by means of a downstream electronics unit or data processing unit.

The reflective surface 14 can moreover provide at least one lateral position signal by way of a reflection of the useful radiation, by means of which the position of the measuring beam decoupler 12 in the x direction can be determined and monitored. The roughness profile of the measured surface can be derived two-dimensionally from the lateral position signal and the measurement signal 17, i.e., the roughness of a surface can thus be determined line-by-line.

The relevant signals can be transported via the beam coupling device 11 out of the sensor 10 and detected and/or further processed outside, for example, on the part of a coordinate measuring machine. Alternatively, an embodiment comprising an optical detector arranged in the sensor 10 for signal detection or also a sensor-side processing unit is conceivable.

Figure 2:
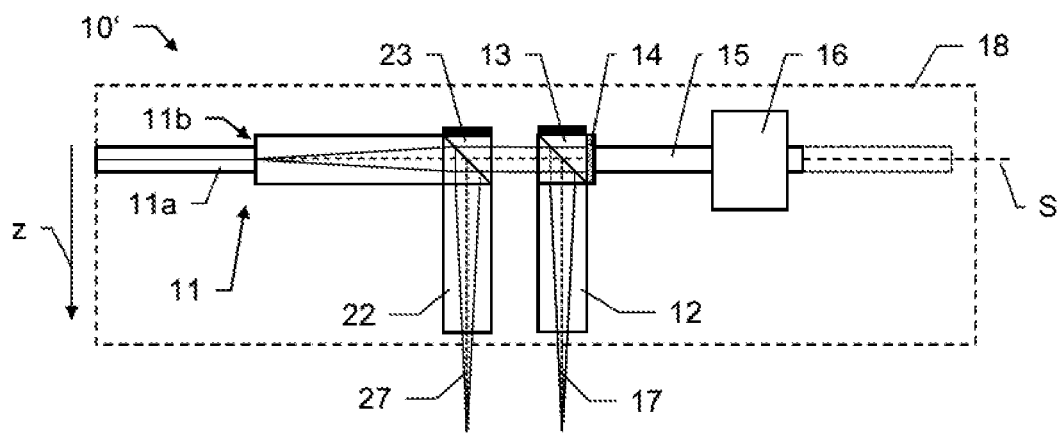
FIG. 2 shows a further embodiment of an optical roughness sensor according to the invention.

FIG. 2 shows a further embodiment of an optical roughness sensor 10' according to the invention for a coordinate measuring machine. Identical or equivalent elements in different figures are provided with identical reference signs.

As already described with the embodiment according to FIG. 1, the sensor 10' also has a beam coupling device 11, a first beam splitter 13, a reflective surface 14 for providing the lateral position signal and in particular the reference signal, a guide rod 15, and a drive unit 16. The mentioned components interact in a comparable manner as described above, i.e., the decoupling channel 12 can be guided by means of the drive 16 along the scanning axis, wherein surface data can be acquired as a result of a reflection of the measuring beam component 17.

The roughness sensor 10' has an additional, second decoupling path 22 comprising a second beam passage window for the bidirectional transmission of a first compensation component 27 of the measuring or useful radiation. The compensation radiation 27 is decoupled by means of a second beam splitter 23 from the optical radiation supplied in the sensor 10'. For example, the second beam splitter 23 has a 50% transmissive or reflective coating. 50% of the supplied radiation is then decoupled as the compensation component 27 and 50% is used jointly for the measuring component 17 and the reference component. The first beam splitter 13 can have a 99% reflective coating, wherein 99% is used as the measuring part and 1% as the reference part.

The second decoupling path 22 of the roughness sensor is provided in relation thereto with a fixed position relation, i.e., in contrast to the first decoupling path 12, the second such path 22 is arranged fixedly and immovably on the sensor (in particular in the sensor housing 18). The second decoupling path 22 thus provides a constant-position emission of the compensation beam component 27 with respect to the sensor 10.

The signal of the local oscillator can, for this and all other embodiments of the invention shown, alternatively or additionally be provided by a first reflection at the end 11b of the fiber ferrule 11a (sleeve) (common path interferometry). All further reflections can then interfere with this and/or a further LO reflection (LO: local oscillator).

A reference for the positioning of the roughness sensor 10' relative to the object surface to be measured in the z direction can be provided by the emission and the acquisition of the reflected compensation radiation 27. The first compensation signal which can be generated in this way represents a distance of the sensor 10' from the object. Since the second decoupling path 22 remains unchanged in the lateral direction x, i.e., remains oriented substantially on a fixed point of the object, while the first decoupling path 12 is moved, in this way position changes can be established independently of a roughness change.

The first compensation signal enables the establishment and offset of occurring oscillations or vibrations of a coordinate measuring machine, which supports the sensor 10', in particular in the z direction. This is carried out on the assumption that during the roughness measurement using the moved measuring radiation 17, a distance measured via the second decoupling path 22 remains constant. If deviations or variations are established along this path, an undesired relative movement thus exists, which can in turn also be processed in a time-resolved manner for the preparation of a surface profile.

Such vibrations can significantly influence the measured roughness of a surface and thus result in a correspondingly erroneous surface profile. Due to the continuous acquisition and consideration of the first compensation signal, a vibration-compensated surface profile can thus be computed. This second embodiment therefore provides a specific roughness sensor 10' for the use with a coordinate measuring machine (CMM), which is moreover capable of compensating for possibly occurring vibrations and oscillations in the CMM or is capable of providing the compensation.

Figure 3:
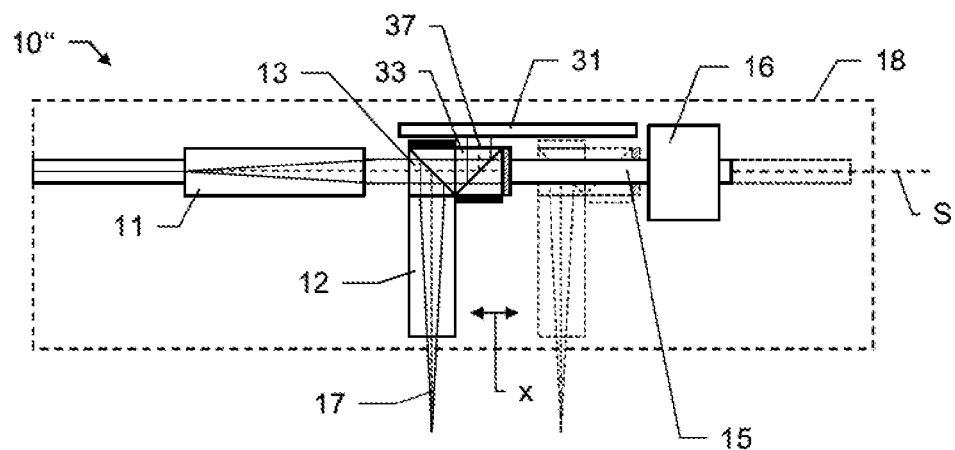
FIG. 3 shows a further embodiment of an optical roughness sensor according to the invention.

FIG. 3 shows a further embodiment of a roughness sensor 10" according to the invention, preferably for use with a coordinate measuring machine.

The embodiment is again based on a sensor 10 according to FIG. 1. In addition to this sensor, the sensor 10" has a fixedly positioned reference component 31 extending parallel to the scanning axis S. The reference component 31 can be designed, for example, as a reflective surface, for example, a mirror. Moreover, a further beam splitter 33 is arranged, which provides a decoupling of a beam part 37 (scanning compensation component). The scanning compensation component 37 is aligned onto the reference component 31 and is reflected thereon. An internal (second) compensation signal is provided in this way. The beam splitter 33 is connected to the decoupling path 17 and accordingly movable jointly therewith (in the x direction).

A distance between the movable decoupling path 12 and the reference element 31 can thus be acquired at a determined rate or also continuously. The arrangement of reference component 31 and beam splitter 33 can hereby provide an internal compensation of the roughness sensor, wherein a linearity of the scanning movement of the first decoupling path 12 can be acquired and monitored. The distance can be derived from a superposition of the reference signal with the internal compensation signal.

In particular, a setpoint distance is defined for the measurement using the roughness sensor 10", which permits, for example, an error-free, linear scanning movement to be concluded if it is maintained over the scanning movement along the scanning axis. Deviations of the distance can be recorded via the scanning position and respective distances can be associated with respective lateral positions of the first decoupling path 12. A possible offset, drift, or vibrations of the moving measuring beam decoupler 12 can thus be detected and processed with the roughness values which can be acquired simultaneously. The arrangement thus enables an acquisition and compensation of (axial, z direction) position errors of the internal sensor arrangement and thus also of the measured surface profile.

To avoid the occurrence of parasitic reflections (due to undesired intermediate interferences) or keep them small, the amplitudes of the reflected signals provided by 14 and 31 can be selected several orders of magnitude smaller than for the reference signal. This can be achieved, for example, by a low transmittance of the beam splitter 13.

Figure 4:
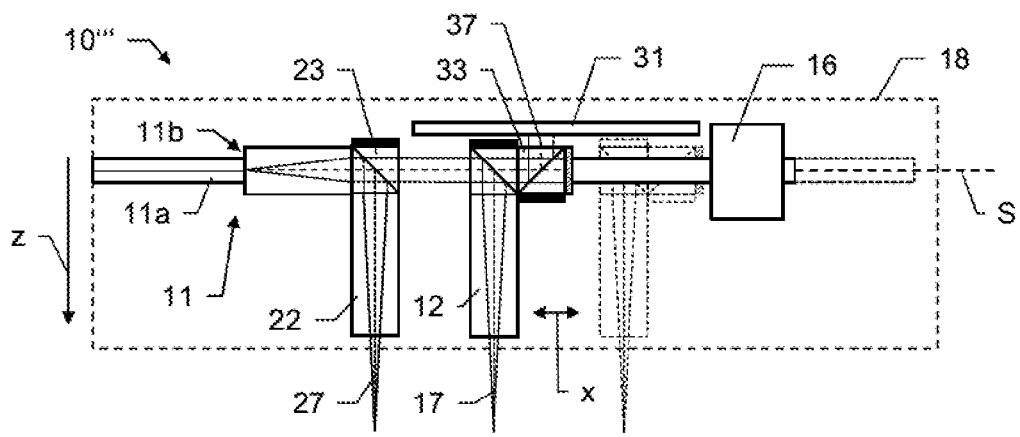
FIG. 4 shows a further embodiment of an optical roughness sensor according to the invention.

FIG. 4 shows an embodiment of a roughness sensor 10''' according to the invention, which represents a combination of the approaches according to FIGS. 2 and 3.

By way of such a combination of the approaches, all above-described concepts can be implemented together in one roughness sensor 10''' on the basis of the different signals. In this way, a sensor 10''' can be provided which makes it possible to compensate for both internal scanning vibrations, for example, caused by the drive unit 16, and also external vibrations as from a coordinate measuring machine (for example, also due to its drives) or other environmental influences. Moreover, one coupled useful radiation can be substantially sufficient for generating these optical signals, wherein this useful radiation can be allocated into the required components in the sensor 10''', i.e., measuring component, first (external) and second (internal) compensation component, and lateral position measuring component.

Different intensities can be defined for the individual signals and reflections by the use of correspondingly different partially-reflecting beam splitters 13, 23, 33. The respective (known) intensity levels can then be taken into consideration for the analysis of these signals, whereby a differentiation of the signals is enabled.

Figure 5:
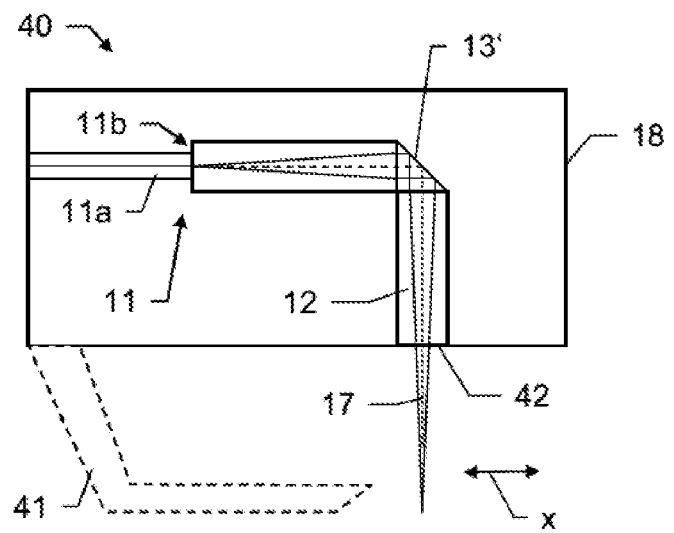
FIG. 5 shows a further embodiment of an optical roughness sensor according to the invention.

FIG. 5 shows a further embodiment of an optical roughness sensor 40 according to the invention for a coordinate measuring machine optionally having a distance reference element 41.

The roughness sensor 40 has a beam coupling device 11, which is again designed here as a fiber coupling 11a comprising optical unit and provides the coupling and the decoupling of optical radiation. The useful radiation is guided by means of an optical fiber into the sensor 40. The local oscillator is provided by a reflection of the entry radiation on the end face 11b of the ferrule 11a of the optical fiber.

The roughness sensor 40 moreover has a coupling unit (not shown), by means of which a modular and repeated coupling of the sensor 40 to a coordinate machine, in particular with repeated high-accuracy relative positioning, is enabled. The coupling unit can be designed for transmitting optical and/or electrical signals.

In the embodiment shown, a beam deflection element 13' (for example, mirror) provides a deflection of the measuring radiation 17 inside the housing 18. The measuring radiation can thus be guided out of the sensor 40 at the lower side of the housing 18 through a beam passage window 42. Reflected measuring radiation can be acquired via the same path. It is apparent that instead of the deflection means 13', the ferrule 11a or optical fiber can be guided up to the beam passage window 42 and the end face 11b (of the ferrule or the fiber) can form the beam passage window 42.

Using such an optical roughness sensor 40, a measurement can be implemented by targeted guiding of the sensor 40 along the surface to be measured. Such a measuring path can be defined in particular on the basis of a known object shape or a known object profile. The guiding is preferably carried out by means of a coordinate measuring machine, wherein the sensor 40 is fastened on a measuring head or on a suitable coupling of the CMM (modular), respectively. Maintaining a constant or high-accuracy known distance between the surface and the sensor is preferable for this purpose. A deviation of this distance can result in significant errors in a roughness measurement. In general, an accuracy for the measurement in the scope of the positioning accuracy of the CMM may be achieved using such a structure.

A distance reference element 41 can optionally be provided on the sensor 40. The distance reference element 41 is designed by way of example as a runner 41 here and is used for the purpose of being placed onto a surface to be measured and being moved over the surface while maintaining the most planar possible contact for a measurement. A constant distance can thus be maintained between surface and sensor 40 during a measurement.

A use of such a distance reference element 41 is advantageously also conceivable using a roughness sensor 10 of FIG. 1. The sensor 10 can be placed on a surface by means of the distance reference element 41, wherein a lateral movement can then take place not by way of a movement of the entire sensor 10, but rather by a lateral offset of the decoupling path 12 in the x direction by means of the drive 16.

In one embodiment, the distance reference element 41 can be embodied, for example, by a three-component support, wherein it has, for example, three curved (for example, spherical or hemispherical) elements on the lower side of the housing 18. A three-point support for the sensor can thus be provided.

Figure 6:
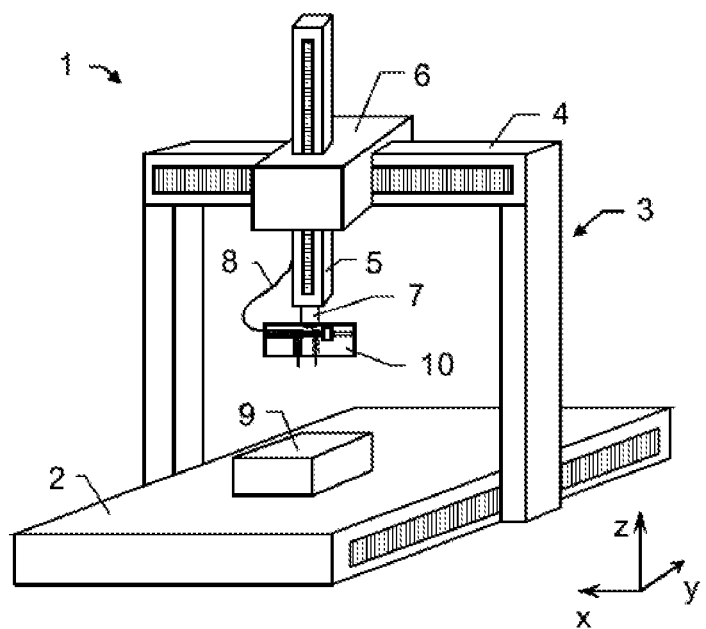
FIG. 6 shows a coordinate measuring machine comprising an optical roughness sensor according to the invention.

FIG. 6 shows a coordinate measuring machine 1, designed by way of example as a gantry coordinate measuring machine 1.

The coordinate measuring machine 1 has a base 2, on which a gantry 3 is arranged such that it is movable in a first direction (y direction). The gantry 3 has two gantry beams, a bridge 4, and a rod or Z column 5, wherein the gantry beams are connected to one another at the upper ends thereof via the bridge 4.

A carriage 6, which is movable along the bridge 4, i.e., in a second spatial direction (x direction) connecting the two gantry beams, is arranged on the bridge 4. The rod or z column 5 is movable in a third spatial direction (z direction) and is guided in a receptacle of the carriage 6. For this movement in the z direction, the Z column 5 is guided in bearings, which are part of the carriage 6. In particular, the three spatial directions x, y, and z are aligned perpendicularly to one another here, although this is not a requirement for the present invention.

The coordinate measuring machine 1 is provided for the determination of one or a plurality of measurement points on an object 9 and therefore has three linear guide mechanisms for enabling the movement of a sensor 10 arranged on the z column 5 in the three spatial directions x, y, and z in relation to the base 2. The sensor 10 is arranged by means of an interface 7 for the modular accommodation of different sensors on the lower free end of the z column 5 facing toward the base 2.

Moreover, the sensor 10 is supplied with optical useful radiation by means of an optical fiber 8. The optical fiber 8 moreover provides a transmission of the signals measured on the part of the sensor 10 out of the sensor 10. Corresponding detectors for the signals and a signal processing unit are provided on the coordinate measuring machine 1. The transmission of the optical radiation can alternatively also be provided integrated into the interface 7.

Each linear guide mechanism has an associated guide (in the x, y, or z direction, respectively). Moreover, each linear guide mechanism has an associated measuring element for determining the position in the associated guide direction, for example, measuring channels for position determinations in the x, y, or z direction, respectively, or linear encoders.

In this embodiment, the measuring head is provided with a roughness sensor 10 according to the invention as shown in FIG. 1. In general, different sensor types can be accommodated by means of the interface 7, for example, tactile sensors, using which a mechanical contact is established to an object surface to be measured, or contactlessly measuring sensors, for example, capacitive, inductive, and optical sensors.

The different sensors can moreover be kept ready in a replacement unit (not shown) and automatically exchanged, i.e., coupled to the interface 7 and decoupled from the interface 7.

The invention is not restricted to gantry coordinate measuring machines as shown in FIG. 1. Rather, any known type of a coordinate measuring machine which enables an object surface measurement using an optical sensor is suitable for the invention.

The coordinate measuring machine 1 moreover has a control and processing unit, comprising a processor and a data carrier. In particular, drives of the coordinate measuring machine 1 are controlled and the measurement data are stored and processed by means of the control and processing unit. The control and processing unit is preferably designed to enable a fully automatic measurement of object surfaces.

For the purpose of direct user interventions or direct user control, the control and processing unit can also be connected to a user console, in particular wirelessly, for example, via radio.

It is obvious that these illustrated figures only schematically illustrate possible exemplary embodiments. The various approaches can also be combined according to the invention with one another and with optical measuring concepts or coordinate measuring machines of the prior art.

What is claimed is:

1. An optical roughness sensor for a coordinate measuring machine, the optical roughness sensor comprising:
   a beam coupling unit for coupling in optical radiation;
   a local reference oscillator element providing a reference path and an interferometric reference signal by means of a reference radiation component of the optical radiation; and
   a first decoupling path comprising a first beam passage window configured for bidirectional transmission of a measuring radiation component of the optical radiation such that:
      the measuring radiation component is able to be aligned onto an object to be measured and a reflection of the measuring radiation component is acquired, and
      a surface signal with respect to an object surface can be provided by the reflected measuring radiation component,
   wherein the reference path and the first decoupling path are arranged such that the reference signal and the surface signal interfere and a roughness signal is derivable based on the interference of reference signal and surface signal.

2. The optical roughness sensor according to claim 1, wherein the optical roughness sensor has a drive unit for moving the first decoupling path, wherein the drive unit is coupled to the first decoupling path such that the first decoupling path is movable in a controlled manner in parallel or coaxially along a scanning axis (S) in relation to the beam coupling unit.

3. The optical roughness sensor according to claim 2, wherein the roughness sensor has a lateral position path for providing a lateral position signal with respect to a scanning axis position of the decoupling path, wherein the lateral position path is defined by a reflection of a lateral radiation component of the useful radiation.

4. The optical roughness sensor according to claim 3, wherein the roughness sensor has a first beam splitter, wherein the first beam splitter provides an at least partial separation of the decoupling path and the lateral position path.

5. The optical roughness sensor according to claim 3, wherein the roughness sensor has a reflective surface, for providing the reflection of the lateral radiation component.

6. The optical roughness sensor according to claim 1, wherein the reference oscillator element is provided by:
   an end face of a ferrule, or
   the reflective surface arranged on the first beam splitter.

7. The optical roughness sensor according to claim 1, wherein the roughness sensor has a signal compensation arrangement for providing at least one compensation signal, wherein:
   an item of information with respect to a measuring position of the roughness sensor in relation to the object surface is provided by a first compensation signal, or
   an item of compensation information with respect to a relative positioning of the decoupling path in a roughness sensor housing is provided by a second compensation signal.

8. The optical roughness sensor according to claim 7, wherein the signal compensation arrangement provides a second decoupling path comprising a second beam passage window for bidirectional transmission of a first compensation component of the optical radiation such that:
   the first compensation component is aligned onto the object to be measured and a reflection at the object of the first compensation component is acquired, and
   the first compensation signal is provided by the reflected first compensation component.

9. The optical roughness sensor according to claim 8, wherein:
   the second decoupling path is arranged in a fixed position relative to the beam coupling unit, or
   the roughness sensor has a second beam splitter which provides the decoupling of the first compensation component from the optical radiation.

10. The optical roughness sensor according to claim 7, wherein the signal compensation arrangement:
    has a reference component extending parallel or coaxially to the scanning axis (S),
    provides a decoupling of a scanning compensation component from the optical radiation along a scanning compensation path, wherein the scanning compensation path is connected to the first decoupling path and is arranged so it is movable by means of the drive unit jointly with the first decoupling path along the scanning axis (S),
    provides a reflection of the scanning compensation component on the reference component for at least a part of a scanning route, and
    the second compensation signal is provided by the reflected scanning compensation component.

11. The optical roughness sensor according to claim 7, wherein the signal compensation arrangement is arranged such that the first or the second compensation signal interfere with the reference signal and a compensated roughness signal is derivable based on an interference of:
    reference signal with surface signal,
    reference signal with first compensation signal, or
    reference signal with second compensation signal.

12. The optical roughness sensor according to claim 1, wherein the reference oscillator element is arranged in a fixed position relation relative to the first decoupling path and is movable jointly with the first decoupling path.

13. The optical roughness sensor according to claim 1, wherein the roughness sensor has a distance reference element arranged in a fixed position relation relative to the beam coupling unit, wherein the distance reference element is designed for the surface-contacting guiding of the roughness sensor and for providing a constant distance to the object surface during a roughness measurement.

14. The optical roughness sensor according to claim 1, wherein:
    the roughness sensor is designed for modular coupling to the coordinate measuring machine, or
    the roughness sensor has an optical and/or mechanical interface, wherein the interface provides:
    a bidirectional transmission of optical radiation between the roughness sensor and the coordinate measuring machine, or
    an energy transfer at least from the coordinate measuring machine to the roughness sensor.

15. A coordinate measuring machine for acquiring an item of surface information with respect to an object to be measured, the coordinate measuring machine comprising:
    a base;
    an interface for arranging a measuring sensor for the acquisition of the item of surface information;
    a guide for providing a relative movement of the interface relative to the base in at least one direction, in particular in two or three directions, and
    a control and processing unit,
    wherein the coordinate measuring machine has a roughness measuring functionality, upon the execution of which, controlled by the control and processing unit, the item of surface information can be acquired by optical scanning by means of an optical roughness sensor as the measuring sensor arranged on the interface,
    wherein in the scope of the roughness measuring functionality:
    the interface is movable into a defined position relative to the object surface,
    a scanning procedure is executable by a relative movement of a first decoupling path of the roughness sensor,
    wherein:
    a measuring radiation component of optical radiation is emitted onto an object surface to be measured and a reflection of the measuring radiation component at the object surface is acquired,
    a dataset representing a surface profile is generated as the item of surface information by means of a surface signal provided by the reflected measuring radiation component with respect to the object surface, and
    the interface remains in a defined position relative to the object surface during the execution of the scanning procedure.

* * * * *